(12) United States Patent
Haertel et al.

(10) Patent No.: US 11,030,427 B2
(45) Date of Patent: Jun. 8, 2021

(54) RFID READER WITH TURNABLE USB CONNECTOR

(71) Applicant: ELATEC GmbH, Puchheim (DE)

(72) Inventors: Stefan Haertel, Puchheim (DE); Matthias Zeleny, Fürstenfeldbruck (DE)

(73) Assignee: ELATEC GMBH

( * ) Notice: Subject to any disclaimer, the term of this patent is extended or adjusted under 35 U.S.C. 154(b) by 0 days.

(21) Appl. No.: 16/883,113

(22) Filed: May 26, 2020

(65) Prior Publication Data

US 2020/0285819 A1 Sep. 10, 2020

Related U.S. Application Data

(63) Continuation of application No. PCT/EP2018/082861, filed on Nov. 28, 2018.

(30) Foreign Application Priority Data

Nov. 30, 2017 (EP) ..................................... 17204671
Feb. 23, 2018 (EP) ..................................... 18158299

(51) Int. Cl.
*G06K 7/10* (2006.01)
*G06F 13/42* (2006.01)

(52) U.S. Cl.
CPC ..... *G06K 7/10316* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 6,008,727 A | 12/1999 | Want | |
| 6,249,226 B1 | 6/2001 | Harrison | |
| 6,340,931 B1 | 1/2002 | Harrison | |
| 6,446,208 B1 | 9/2002 | Gujar | |
| 2006/0138232 A1 | 6/2006 | Hammerslag | |
| 2006/0219776 A1* | 10/2006 | Finn | G06K 19/07732 235/380 |
| 2008/0133815 A1 | 6/2008 | Mori | |
| 2009/0273445 A1 | 11/2009 | Sher | |
| 2011/0159704 A1 | 6/2011 | Lee | |
| 2011/0227535 A1 | 9/2011 | Caskey | |
| 2013/0149893 A1 | 6/2013 | Bisesti | |
| 2014/0017918 A1 | 1/2014 | Guo | |

FOREIGN PATENT DOCUMENTS

| | | |
|---|---|---|
| DE | 20105908 U1 | 6/2001 |
| JP | 2011039694 A | 2/2011 |

* cited by examiner

*Primary Examiner* — Kristy A Haupt
(74) *Attorney, Agent, or Firm* — Yakov Sidorin; Quarles & Brady LLP

(57) ABSTRACT

The invention relates to a RFID reader with a housing, a RFID reader circuit and an USB connector. The housing has a sensor section and a connector section that is distant from the sensor section. The RFID reader circuit includes an antenna and a RFID transmitter/receiver circuit connected to the antenna, which is mounted in the sensor section of the housing. The USB connector is mechanically connected to the housing by a turnable attachment means and electrically connected to the RFID transmitter/receiver circuit by a flexible cable.

14 Claims, 6 Drawing Sheets

RFID READER WITH TURNABLE USB CONNECTOR

CROSS-REFERENCE TO RELATED APPLICATIONS

This application is a continuation of the pending International Application No. PCT/EP2018/082861 filed on 28 Nov. 2018, which designates the United States and claims priority from European Application No. 17204671.6 filed on 30 Nov. 2017 and European Application No. 18158299.0 filed on 23 Feb. 2018. The disclosure of each of the above-identified patent applications is incorporated herein by reference.

BACKGROUND

1. Field of the Invention

The invention relates to a secure retrofit RFID reader for printer solutions.

2. Description of Relevant Art

Data security becomes more and more essential in commercial environments. In companies with central printer solutions limited access to sensible data content is not guaranteed. Unintended publication of sensible information—as well as spying on corporate secrets by visitors or other employees capturing printed documents from the printer station—may occur. Secure printing solutions with Radio Frequency Identification (RFID) readers for identifying a user at the printer station are known. Older printing systems, however, do not have such an identifying system. Therefore, a retrofit solution for older printing systems without a RFID reader is needed.

JP5227917B2 discloses a handy type RFID reader. The reader has a reader body with an USB cable connected thereto. The USB cable is for connecting the reader to a printing system without a RFID reader unit. The reader requires a storage area and the USB plug may be disconnected easily by an unauthorized person. US 2014/0017918 A1 discloses a network terminal with a tiltable USB connector coupled by a slipring to the housing. US 2009/0273445 A1 discloses a RFID reader with a fixed USB connector. US 2013/149893 A1 discloses a power adapter cord including a rotatable connector having a slipring. US 2011/0227535 A1 discloses a charge clip for cellular telephones including a power conversion plug which can be inserted in 90° displaced positions into the clip. US 2008/133815 A1 discloses an USB hub with a stationary base station and a removable second hub. The removable second hub has a rotatable USB connector which forms together with a power connector a friction fit to hold the hub in a rim of the stationary base station. US 2011/159704 A1 discloses an electrical power receptacle with rotatable USB jacks. DE 201 05 908 U1 discloses a USB card reader with rotatable USB connector.

SUMMARY

Embodiments of the invention provide a simple and inexpensive solution for a retrofit RFID reader that may be attached to a printer or any other electronic device. The solution has to be flexible as well as easily connectable to different printer systems. Furthermore, the RFID reader may be small and visually appealing in its design.

In one embodiment, an RFID reader includes a housing, an RFID reader circuit, and an USB connector. The RFID reader preferably is optimized to be installed to an electronic device such as a printer and to remain there for a longer period, possibly the whole lifetime of the electronic device or the RFID reader.

The RFID reader circuit includes at least one antenna and an RFID transmitter/receiver (transceiver) circuit connected to the at least one antenna. The transmitter/receiver circuit may be attached next to the antenna. The antenna may be integrated into the RFID transmitter/receiver circuit, e.g. on the same printed circuit board.

The USB connector is connected to the RFID transmitter/receiver circuit by a cable and/or a plurality of wires. The cable and/or wires may be flexible. The cable and/or wire connection may be used instead of a sliding contact or slipring connection as it has higher reliability and ensures lower costs. Specifically, in a long-time installation with no movement occurring, a slip ring is known to suffer from contact corrosion. Cable break typically presents no substantial issue, as there normally is a low number of movements during installation.

The USB connector may be mechanically connected to the housing at a connector section of the housing by a turnable attachment means or connector.

The housing includes a sensor section and a connector section, which preferably are coupled together. The coupling may be implemented with at least one clip and/or by using glue between the sections.

The housing preferably includes a top part or portions and a bottom part or portion, with both parts preferably including a plastic material. The top part preferably includes the sensor section which may support the RFID reader circuit. The top part may have an additional LED for displaying the status of the RFID reader.

The sensor section preferably is part of the housing and preferably of a detection zone for an RFID transponder. The sensor section may be part of a lid respectively, of the top part of the housing) and may contain an antenna within the lid. Alternatively, the antenna may also be aligned below the lid within the housing. The antenna may be attached to a circuit board for mechanically supporting the antenna.

The sensor section of the housing preferably has an essentially planar outer surface, as would be considered by a skilled artisan, and holds or accommodates the RFID reader circuit within the housing.

The bottom part of the housing preferably holds the USB connector at the connector section. The USB connector may be a USB plug connector attached to the housing. The term plug connector refers to a male USB plug.

The connector section of the housing preferably has an essentially planar outer surface preferably located to oppose the outer surface of the sensor section.

In a specific case, the connector section may be arranged to be distant from the sensor section. The USB connector preferably is orthogonal to a main plane of the antenna. The sensor section of the housing may have an outer surface that is essentially planar and essentially parallel to (as viewed by a person skilled in related art, for example deviating within +/−5 degrees or less from) the main plane. The alignment of the USB connector improves the receiving characteristics of the antenna. In general, metal parts in the proximity of the antenna influence the characteristics of the antenna and the transmitting/receiving properties. A large series of tests have shown that a USB connector, which usually has an outer metal shield, has a reproducible and therefore compensable influence if such connector is positioned at a defined location relative to the antenna. Rotating such a connector about an axis orthogonal (that is, perpendicular) to the main plane of the antenna results in negligible changes of the influence produced by the connector.

The connector section of the housing preferably has an opening from an inner surface to an outer surface and configured to accommodate the attachment means. The attachment means has a support or support element, which may be dimensioned to cove the opening at its outer surface. The opening may be structured to be stepped or graded. In this context, the term "stepped" means that the opening has a first diameter corresponding to the thickness and the diameter of the support, but it may only be configured as a counter-bore. The opening may also have a second diameter, which is smaller than the first diameter and extends from the inner surface to the outer surface. In a related case, the support may be configured as a circular disc. The support may have an opening for holding a USB plug connector. The attachment means further may have at least two holding protrusions connected to the attachment means. The protrusions may protrude orthogonally from a surface of the attachment means. The attachment means may further have a catch element structured to hold f the USB plug in the opening of the attachment means. The opening of the connector section may have at least two notches at the sidewall of the opening. The term "sidewall" relates to and defines the surface orthogonal with respect to the outer surface, respectively the inner surface. The notches preferably match to the holding protrusions for inserting the attachment means with the holding protrusions into the opening.

In an assembled state, the attachment means preferably is inserted into the opening of the connector section. The attachment means may be rotated such that the inner surface of the housing bears the holding protrusions.

In at least one embodiment, at least one stop or stopper is provided and used on the inner surface of the housing, respectively the bottom part; such stop preferably has a wedged shape dimensioned to limit the rotation of the attachment means. Alternatively or in addition, the stop or stopper may also have a concave or convex shape. The stop or stopper is configured to interact with at least one holding protrusion, such that the attachment means is enabled to be rotated from a position where the holding protrusions are close to the notches, to at least one position where the holding protrusions are distant from the notches and blocked or prevented from being rotated back afterwards. The USB connector may be configured to be turnable (within and/or by an angle of less than 200 degrees, preferably within 160 degrees, most preferably within 90 degrees). To limit the degree of rotation, another stopper may be employed on the inner surface of the housing at the opening.

The attachment means may be dimensioned such that, when inserted or installed to the outer housing, a surface of the attachment means is at the same level as the housing surface—that is, the attachment means forms one planar surface with the housing surface, respectively the outer surface of the bottom part. The USB connector may protrude orthogonally from the housing such that it may protrude orthogonally to a main plane of the at least one antenna from the housing.

Preferably, the USB connector is a double-sided connector, which may be plugged into an USB socket at two positions rotated with respect to one another by 180°. In conjunction with a double-sided USB connector, the RFID reader may be made to be rotatable around substantially 360°, while the connector is configured to rotate by at most 90°, which prevents twisting of the cable. There may also be a button for locking/unlocking rotation.

A first pair of detents may be on opposing sides of the opening. A second pair of detents may be on opposing sides of the opening. The connecting line between the first pair of detents and the second pair of detents crosses in a right angle. Thus, the detents are angularly shifted by 90 degrees with respect to one another. The holding protrusions may have indents corresponding to the detents for giving a haptic feedback when rotating the holding protrusion over the detents.

In one embodiment, the housing may have an angle indicator or indicia—for example the one configured as an arrow with two position indicators or marks. The position marks may correspond to one corresponding position indicator or mark located at the support. The arrow and the position indicators at the bottom part of the housing show the possible angle of rotation of the support. The housing may have an adhesive surface judiciously structured to have the RFID reader mounted to a surface of a printer system. The adhesive surface may include an adhesive tape, in one case. Alternatively, an assembly bracket may be used, which may be mounted at different locations of the housing.

There may be employed means for locking the USB connector in specific rotated states (such as in angular positions of 0° and 180°, preferably with respect to a longitudinal axis of the housing). There may be other angular steps or states of rotation in which the USB connector can be locked—such as 90°, 45°, 30° or 10°, as non-limiting examples).

In a related implementation, the housing may have an additional USB socket connected to the RFID transmitter/receiver circuit. The USB socket may be attached to be flush-fitting (at the level) with the surface of the top part of the housing. The USB socket may also be connected to the printer via the USB connector. The USB socket of the RFID reader may be used for connecting a USB dongle to the RFID reader for identifying a user or for connecting a standard USB device to the RFID reader or to the printer via the RFID reader to send documents to the printer. Basically, the USB socket may be configured as a replacement for the USB socket of the printer used by the RFID reader, such that other USB devices may still be connected to the printer. The USB socket may be disconnected by a mechanical or an electronic switch.

The USB connector as well as the USB socket may be of type A, B, or C. The RFID reader may have further, additional USB sockets.

The RFID reader may have an adhesive tape at the same plane as that from which the USB connector protrudes from the housing for connecting the RFID reader to some other surface (for example, that of a printer station). That means that the adhesive tape may be aligned to the housing at the outer surface of the bottom side of the housing. Adhesive tape means a double-sided tape. A double-sided tape may be used to prevent the removal the RFID tag from the surface it is attached to. Thus, the removal might only be carried out with a high degree of necessary force or by substantially destroying the RFID reader.

The RFID reader may further include a secure access module (or secure application module) SAM, also called SAM module or a smartcard reader for a SAM which is based on SmartCard Integrated Circuits. The SAM is used to enhance the security and cryptography performance in devices, commonly in devices needing to perform secure transactions, such as printer stations. It may be used for cryptographic computation and secure authentication against smartcards or contactless EMV cards. Physically, a SAM card may either be a SIM card and plugged into a SAM slot in a reader attached to the RFID reader, or a fixed integrated circuit in a housing directly soldered on a printed circuit board of the RFID reader.

Basically, this RFID reader may be used for any device or application which has an USB connector. Instead of the USB connector any other bus connector may be used.

Generally, an RFID reader circuit may include a microcontroller and a reader IC to communicate over the RF interface with a contactless smartcard. The microcontroller takes the part of controlling the reader IC functions, such as protocol handling, command flow and data interpretation. By integrating a SAM into the reader system, the SAM handles all the key management and cryptography in a secure way. The entire system enables authentication and encryption of the contactless communication between the SAM and host system.

The housing of the RFID reader may be structured to have a lockable cover within the sensor section. The lockable cover in this case is configured to cover the SAM module. The SAM module may be attached to the housing within the area of the antenna, respectively within the sensing area. The antenna is attached on the upper surface of the top part of the housing. The antenna may also be attached below the upper part within the housing. The lockable cover may be covered by a security label. The security label prevents an unauthorized opening of the lockable cover, and is configured to be irreparably damaged by an attempt to remove it.

BRIEF DESCRIPTION OF THE DRAWINGS

In the following, the invention will be described by way of examples of embodiments, without limitation of the general inventive concept and with reference to the drawings.

Figure 1:
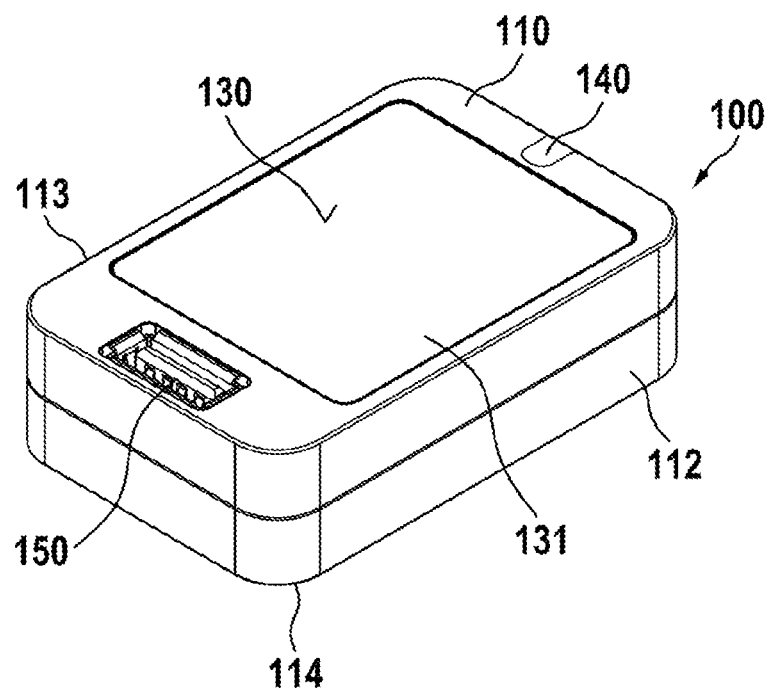
FIG. 1 shows a 3D view of an RFID reader.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but to the contrary, the intention is to cover all modifications, equivalents and alternatives falling within the spirit and scope of the present invention as defined by the appended claims.

DETAILED DESCRIPTION

FIG. 1 shows a 3D view of an RFID reader 100. The RFID reader 100 includes a housing 110 with a top part 113 and a bottom part 114 (with an outer surface 112) that form the housing 110. The top part 113 has a sensor section 130 configured to communicate with an RFID transponder attached or held by a user next to the sensor section 130. The top part 130 further has an LED 140 for displaying the status of the RFID reader 100 and an USB socket 150. The USB socket 150 is attached flush-fitting with the surface of the top part 113 of the housing 110. An antenna 131 may be attached to the sensor section 130.

Figure 2:
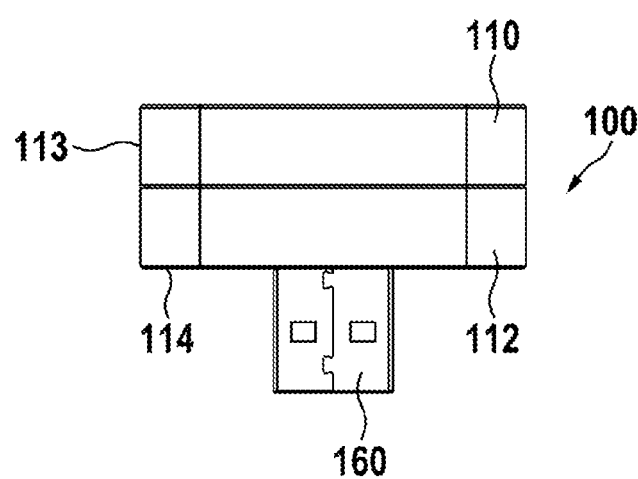
FIG. 2 provides a front view of an RFID reader.
Figure 3:
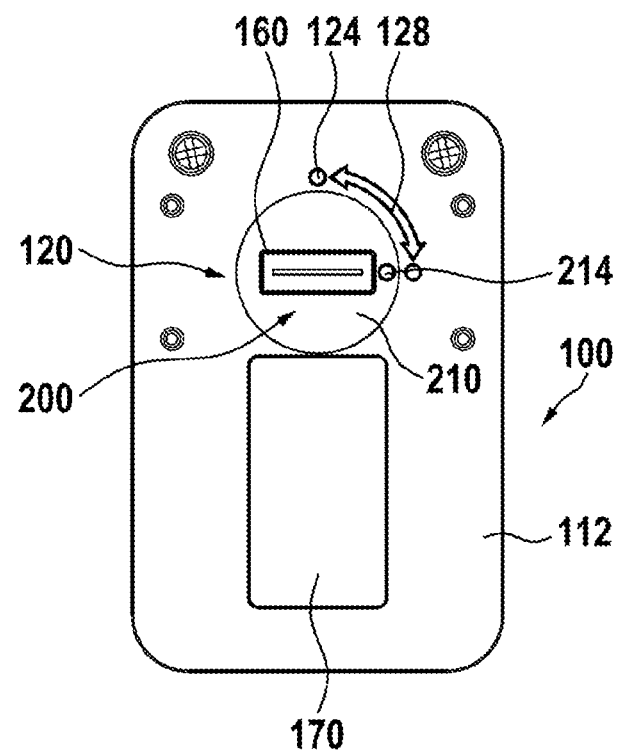
FIG. 3 is a bottom view of an RFID reader.

FIG. 2 shows the RFID reader 100 in the front view. The housing 110 has a USB connector 160 formed as an USB plug protruding orthogonally respectively from the bottom part 114 of the housing 110. The USB connector 160 is configured to connect the RFID reader 100 to an USB socket. As shown in FIG. 3, the USB connector 160 is attached to an attachment means 200 that is further affixed to the housing 110. The attachment means 200 allows to rotate the USB connector 160 by 90 degrees within the housing 110.

FIG. 3 shows a bottom view, respectively the bottom part 114 of an RFID reader 100. The bottom part 114 has an outer surface 112. The USB connector 160 protrudes orthogonally from the bottom part 114 of the housing 110 of the RFID reader 100. As shown in FIG. 3, the USB connector 160 is attached to an attachment means 200 that is further affixed to the bottom part 114 of the housing 110. The attachment means 200 allows to rotate the USB connector 160 by 90 degrees within the housing 110. The attachment means or component 200 has a support portion 210 flushing with the outer surface 112 of the bottom part 114 of the housing 110. An arrow 128 with two position indicators 124 are present at the bottom part 114 of the housing 110 to illustrate a possible angle of rotation of the support 210. The position indicators 124 correspond with/to one position indicator 214 at the support 210. The housing 110 accommodates an adhesive surface 170 for mounting the RFID reader 100 to a surface of a printer system or any other electronic device.

Figure 4:
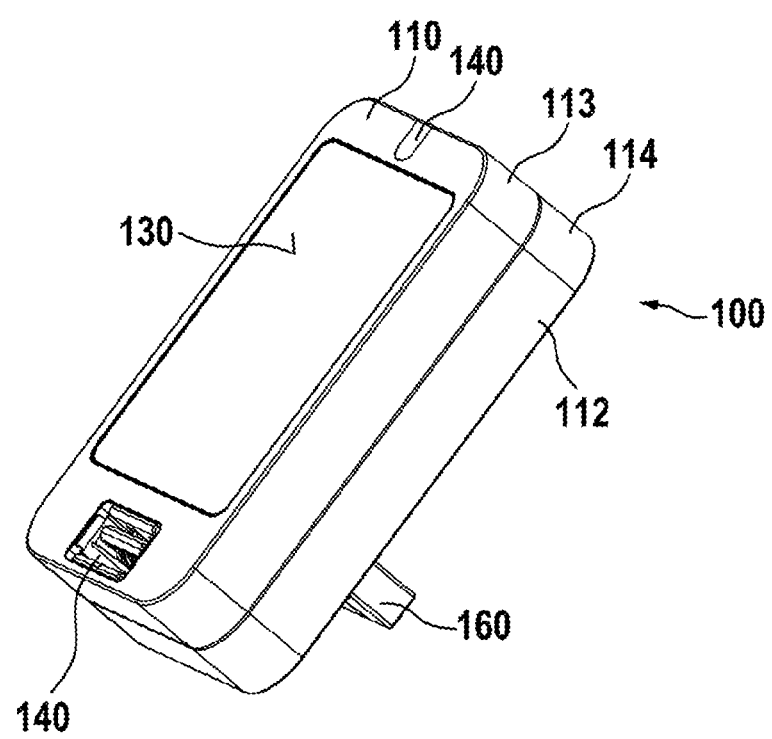
FIG. 4 illustrates a 3D view of an RFID reader.

FIG. 4 shows another perspective, 3D view of the RFID reader 100.

Figure 5:
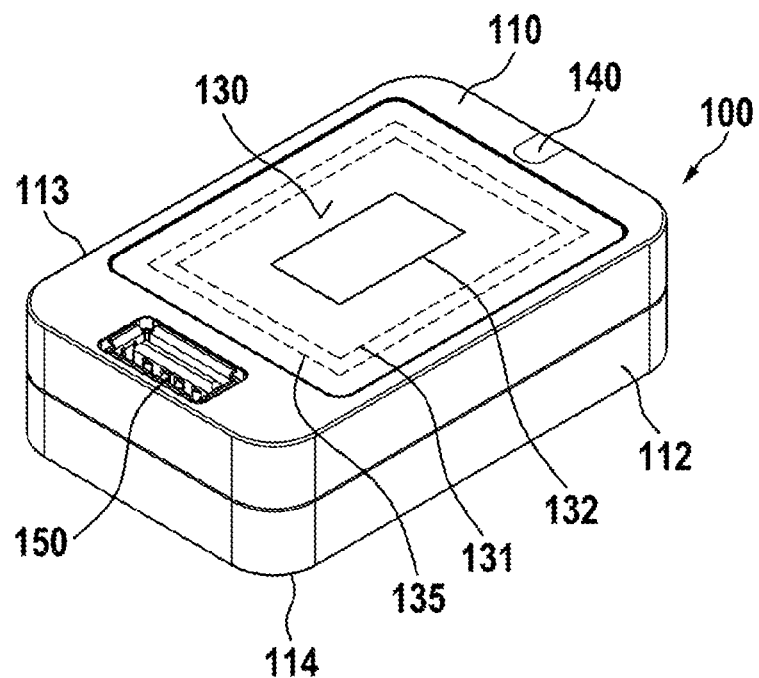
FIG. 5 depicts a 3D view of an RFID reader.

FIG. 5 shows a 3D view of the RFID reader 100 according to FIG. 1 with additional detail. The RFID reader has a lockable cover 132 within the sensor section 130. The lockable cover 132 covers a SAM module (not shown) that is attached to the housing within the antenna 131. The antenna 131 is attached on the upper surface of the top part 113 of the housing 110, or—alternatively—below the upper part within the housing 110. The lockable cover 132 may be covered by a security label 135, which is configured to prevent, inhibit, hinder and/or evidence an unauthorized opening of the lockable cover 132.

Figure 6:
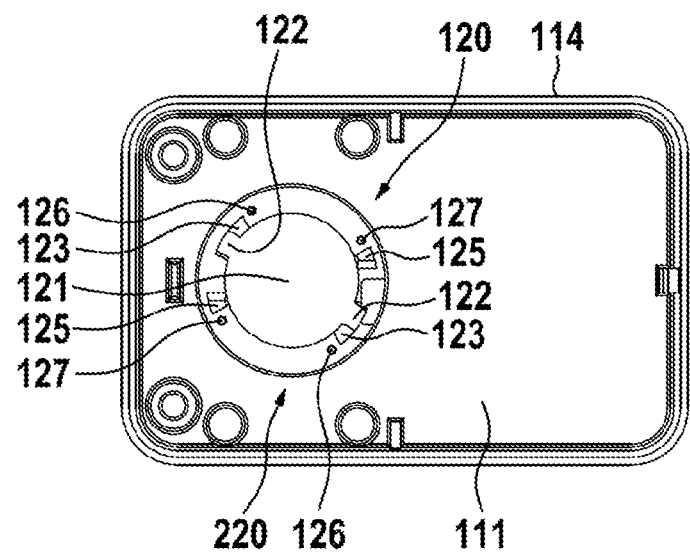
FIG. 6 shows the bottom part of the RFID reader.

FIG. 6 illustrates the bottom part 114 of the RFID reader 100 in an open state from below (a bottom view). The opening 121 has a graded height. The view shows the inner surface 111 of the bottom part 114. The bottom part 114 has a connector section 120. The connector section 120 includes an opening 121 (extended from the outer surface 112 to the inner surface 111 of the bottom part 114) dimensioned to receive the attachment means 200. The opening has two additional notches 122. The opening has two stops or stoppers 123 at the inner surface around the opening 121 next to the two notches 122. The stops 123 are wedge-shaped. Around the opening 121 there are two additional stops or stoppers 125. A first pair of detents 126 is attached at opposing sides of the opening 121. A second pair of detents 127 is provided at opposing sides of the opening 121. The detents 126, 127 preferably are shifted by 90 degrees with respect to one another as viewed.

Figure 7:
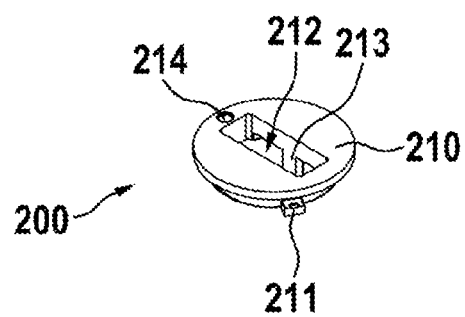
FIG. 7 exhibits the attachment means in a top view.

FIG. 7 depicts the attachment means 200. The attachment means 200 has the support element or covering 210 that forms a ring-like component and/or has a circular outer perimeter dimensioned to correspond to and fit in the opening 121. The attachment means 200 has two holding protrusions 211 protruding or projections orthogonally from the attachment means 200 under the support element 210. The holding protrusions 211 correspond to and are dimensioned to fit the notches 122. The attachment means has an opening 212 located centrally in the support 210 and configured to hold the USB connector 160.

Figure 8:
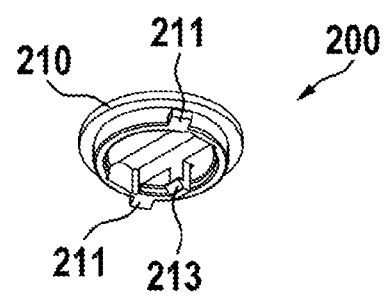
FIG. 8 shows the attachment means in a bottom view.

FIG. 8 shows an attachment means 200 according to FIG. 7 with a catch 213 for holding the USB connector 160.

Figure 9:
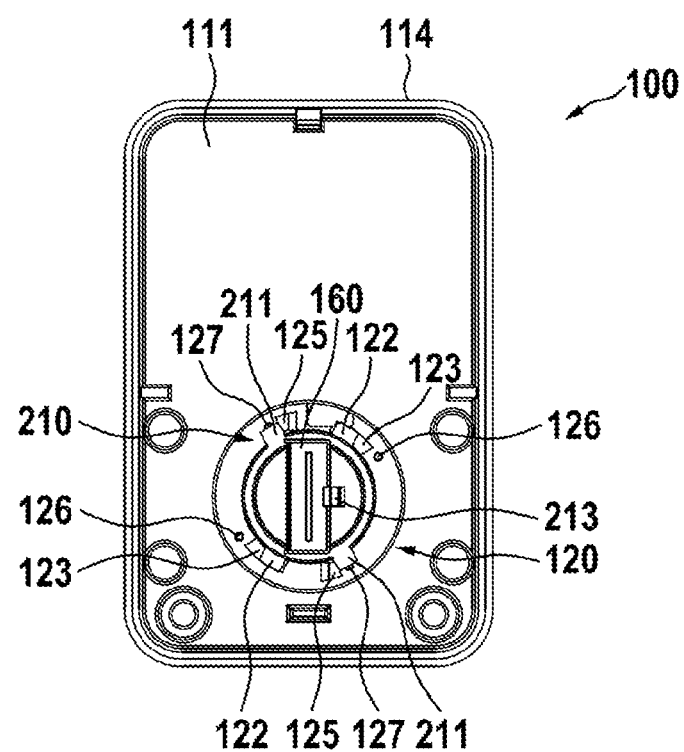
FIG. 9 illustrates the bottom part of the RFID reader with the attachment means.

FIG. 9 provides a view of the housing 110 of the RFID reader 100 in an open state with the attachment means 200 inserted in the opening 121. The attachment means 200 is shown to have been turned after being inserted into the opening 121. Thus, the holding protrusion 211 glides over the wedge-shaped stop 123. The stop 125 limits the rotation of the attachment means 200.

Generally, "a" or "an" may be understood as singular or plural, in particular with the meaning "at least one", "one or more", etc., unless this is explicitly excluded, for example by the term "exactly one", etc.

In addition, numerical values may include the exact value as well as a usual tolerance interval, unless this is explicitly excluded.

Features shown in the embodiments, in particular in different embodiments, may be combined or substituted without leaving the scope of the invention.

It will be appreciated by those skilled in the art and having the benefit of this disclosure that this invention provides and discusses RFID readers. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A radio-frequency identification (RFID) reader comprising
a housing, an RFID reader circuit, and a universal serial bus (USB) connector,
the housing including a sensor section and a connector section,
a secure access module SAM,
a lockable cover in the sensor section located above the secure access module SAM,
the RFID reader circuit including at least one antenna defining a main plane and an RFID transmitter-receiver circuit connected to the at least one antenna,
the USB connector being electrically connected to the RFID transmitter-receiver circuit by at least one of a cable and a plurality of wires,
the sensor section of the housing accommodating the RFID reader circuit within the housing,
and
wherein the connector section of the housing holds the USB connector by a turnable attachment means, wherein the turnable attachment means is configured to allow only a rotation of the USB connector about an axis orthogonal to the main plane.

2. The RFID reader according to claim 1,
wherein the sensor section of the housing has a first planar outer surface that is parallel to the main plane, and
the connector section of the housing has a second outer surface opposing the first planar outer surface.

3. The RFID reader according to claim 1,
wherein the connector section of the housing has an opening from an inner surface of the housing to an outer surface of the housing, the opening dimensioned to accommodate the turnable attachment means,
wherein the turnable attachment means has a support covering the outer surface of the housing when the turnable attachment means is cooperated with the opening, and
wherein the turnable attachment means further has at least two holding protrusions connected to the support covering.

4. The RFID reader according to claim 3, wherein the opening has at least two notches at a sidewall of the opening, the at least two notches dimensionally matching the at least two holding protrusions and configured to receive the at least two holding protrusions when the turnable attachment means with the at least two holding protrusions is inserted into the opening.

5. The RFID reader according to claim 4,
wherein the inner surface of the housing carries at least one stopper configured to interact with at least one of the at least two holding protrusions such that,
when the turnable attachment means is rotated from (a) a first position, in which the at least two holding protrusions are close to the at least two notches, to (b) a second position, in which the at least two holding protrusions are distant from the at least two notches, the turnable attachment means is blocked from being rotated back afterwards.

6. The RFID reader according to claim 3,
wherein the turnable attachment means is configured to be rotated, in an assembled state of the RFID reader, when the turnable attachment means is inserted into the opening, such that the inner surface bears the at least two holding protrusions.

7. The RFID reader according to claim 1, wherein the turnable attachment means is dimensioned to form a planar surface with the outer surface of the housing.

8. The RFID reader according to claim 1, wherein the housing has a USB socket connected to the RFID transmitter-receiver circuit.

9. The RFID reader according to claim 1, wherein the USB connector is a plug connector.

10. The RFID reader according to claim 1, wherein the USB connector is a double-sided connector.

11. The RFID reader according to claim 1, wherein the RFID reader comprises a smartcard reader for the secure access module SAM.

12. The RFID reader according to claim 11, wherein the lockable cover is disposed in the sensor section above the smartcard reader.

13. The RFID reader according to claim 1, wherein the lockable cover in the sensor section is covered by a security label configured to prevent the lockable cover from being opened, wherein the security label configured to be irreparably damaged by an attempt to remove the security label.

14. The RFID reader according to claim 1, including an adhesive tape at the same plane from which the USB connector protrudes from the housing, the adhesive tape configured to have the RFID reader attached to an auxiliary surface.

\* \* \* \* \*